United States Patent
Chang et al.

(10) Patent No.: US 9,507,830 B2
(45) Date of Patent: Nov. 29, 2016

(54) TAILORING USER EXPERIENCE FOR UNRECOGNIZED AND NEW USERS

(71) Applicant: GOOGLE INC., Mountain View, CA (US)

(72) Inventors: Pi-Chuan Chang, Mountain View, CA (US); Daniel Ramage, Mountain View, CA (US)

(73) Assignee: Google Inc., Mountain View, CA (US)

( * ) Notice: Subject to any disclaimer, the term of this patent is extended or adjusted under 35 U.S.C. 154(b) by 265 days.

(21) Appl. No.: 14/206,880

(22) Filed: Mar. 12, 2014

(65) Prior Publication Data

US 2014/0280221 A1    Sep. 18, 2014

Related U.S. Application Data

(60) Provisional application No. 61/780,141, filed on Mar. 13, 2013.

(51) Int. Cl.
*G06F 17/30* (2006.01)

(52) U.S. Cl.
CPC ..... *G06F 17/3053* (2013.01); *G06F 17/30699* (2013.01); *G06F 17/30867* (2013.01); *G06F 17/30876* (2013.01)

(58) Field of Classification Search
CPC ............. G06F 17/3053; G06F 17/30699; G06F 17/30867; G06F 17/30876
USPC ................................. 707/736, 751
See application file for complete search history.

(56) References Cited

U.S. PATENT DOCUMENTS

| | | | |
|---|---|---|---|
| 6,266,649 B1 | 7/2001 | Linden et al. | |
| 2002/0010625 A1* | 1/2002 | Smith | G06Q 30/02 705/14.52 |
| 2003/0187837 A1* | 10/2003 | Culliss | G06F 17/30699 |
| 2004/0255133 A1* | 12/2004 | Lei | G06F 21/6227 713/193 |

FOREIGN PATENT DOCUMENTS

| | | |
|---|---|---|
| EP | 2397952 A1 | 12/2011 |
| WO | 2013/006432 A1 | 1/2013 |
| WO | 2014/165186 A2 | 10/2014 |

OTHER PUBLICATIONS

"Collaborative Filtering", from Wikipedia, the free encyclopedia, http://en.wikipedia.org/wiki/Collaborative_filtering, Apr. 25, 2014, 10 pages.
International Search Report and Written Opinion for PCT Patent Application No. PCT/US2014/024686, mailed on Nov. 14, 2014, 12 pages.

(Continued)

*Primary Examiner* — Thu-Nguyet Le
(74) *Attorney, Agent, or Firm* — Brake Hughes Bellermann LLP (57) ABSTRACT

A system stores a table mapping users to attributes, and stores a second table mapping the users to products associated with a source domain. The system determines a set of top scoring products for each of the attributes, and creates, using the top scoring products, a model that is predictive of an activity in a target domain, the target domain being separate from the source domain. The system detects a behavior from a particular user accessing the target domain, and generates a personalized prediction for the particular user based on the model, in response to the detecting the behavior.

20 Claims, 7 Drawing Sheets

(56) References Cited

OTHER PUBLICATIONS

Davies et al., "Networked Information Management", BT Technology Journal, vol. 15, No. 2, Apr. 1997, pp. 194-208.

Zhang et al., "Efficient Bayesian Hierarchical User Modeling for Recommendation Systems", SIGIR'07, Jul. 23-27, 2007, 8 pages.
International Preliminary Report on Patentability for PCT Patent Application No. PCT/US2014/024686, mailed on Sep. 24, 2015, 8 pages.

\* cited by examiner

FIGURE 1

Figure 2 puppies — 310    [Search]    300

Puppy T-Shirt — 320

*www.exampleURL.com/puppyshirt*

*Purchase the puppy t-shirt*

Puppy Videos — 330

*www.exampleURL2.com/puppyvideos*

*Browse our collection of the cutest puppy picks around. Vote for your favorite puppies here . . .*

Puppy Instructions — 340

*www.exampleURL3.com/puppycare*

*Caring for puppies can be broken down into three simple puppy steps. First, make sure that . . .*

TAILORING USER EXPERIENCE FOR UNRECOGNIZED AND NEW USERS

CROSS REFERENCE TO RELATED APPLICATIONS

This application claims priority to, and is a continuation of, U.S. Provisional Patent Application No. 61/780,141, filed on Mar. 13, 2013, entitled "Tailoring User Experience for Unrecognized and New Users," the disclosure of which is incorporated by reference herein in its entirety.

BACKGROUND

This specification relates generally to providing recommendations to users and to providing search results in response to search queries. A search engine receives search queries, for example, from one or more users and returns search results responsive to the queries. As another example, the search engine can optionally receive queries from and return search results to a computing resource, such as another search engine.

For example, the search engine can identify resources responsive to a search query, generate search results with information about the documents, and provide the search results in response to the query. Examples of resources include resources, such as web pages, videos, books, and sound files. Other types of search results, for example, direct answers to questions posed by the user, or a summary of information responsive to the user's query, can also be provided.

SUMMARY

A system provides a customized experience for users for which the system lacks a detailed history of on-line behavior and interests, by identifying similar user types.

According to one implementation, a method includes storing a table mapping users to attributes; storing a second table mapping the users to products associated with a source domain; determining, using a processor of a computer system, a set of top scoring products for each of the attributes; creating, using the top scoring products, a model that is predictive of an activity in a target domain, the target domain being separate from the source domain; detecting a behavior from a particular user accessing the target domain; and generating a personalized prediction for the particular user based on the model, in response to the detecting the behavior. In some implementations, the users have activity in both the source domain and the target domain.

Implementations may include one or more of the following features, alone or in combination with each other. The method may include determining that the particular user lacks recorded behavior in the target domain; determining that the particular user has recorded behavior in the source domain; generating the personalized prediction using the recorded behavior in the source domain; and providing the personalized prediction for the particular user. The products may include at least one of a video, a purchased product, a search query, or a suggested activity. The set of top scoring products may be limited to within a predetermined time period. The attributes may include demographics, clusters, or entities. Creating the model may be performed offline. Creating the model may be in response to detecting the activity in the target domain.

Other implementations of this aspect include corresponding systems, apparatus, and computer programs, configured to perform the actions of the methods, encoded on computer storage devices.

In yet another implementation, a method includes determining users having a set of matching attributes; storing a set of products associated with a source domain and accessed by each of the users; determining a subset of the products corresponding to each attribute of the set of matching attributes; creating, using the subset of the products, a model that is predictive of an activity in a target domain, the target domain being separate from the source domain; determining that a particular user lacks recorded behavior in the source domain; in response to determining that the particular user lacks recorded behavior in the source domain, determining that the particular user has sufficient recorded behavior in a proxy domain, the proxy domain being separate from the source domain and having similar properties as the source domain; and in response to determining that the particular user has sufficient recorded behavior in the proxy domain, generating a personalized prediction for the particular user based on the sufficient recorded behavior in the proxy domain, using the model, the personalized prediction for the particular user being generated in response to the particular user performing the activity while accessing the target domain.

Implementations may include one or more of the following features, alone or in combination with each other. The method may include accessing a first encrypted data store that maps users to attributes, and accessing a second encrypted data store that maps the users to products. The products may include at least one of a video, an item, a search query or a suggested activity. Creating the model may be performed offline. The method may include creating the model in response to detecting the activity in the target domain. The method may also include determining the users having the set of matching attributes based on encrypted tables including data from behaviors in multiple domains.

Other implementations of this aspect include corresponding systems, apparatus, and computer programs, configured to perform the actions of the methods, encoded on computer storage devices.

One or more of the implementations of the subject matter described here may provide one or more of the following advantages. The personalized content reflects the interests of the user. The system provides a customized and helpful experience to users in a product for which the system lacks a detailed history of online behavior and interests, but where detailed information about those users exists in another product (and for instances where users have consented to the use of such information).

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
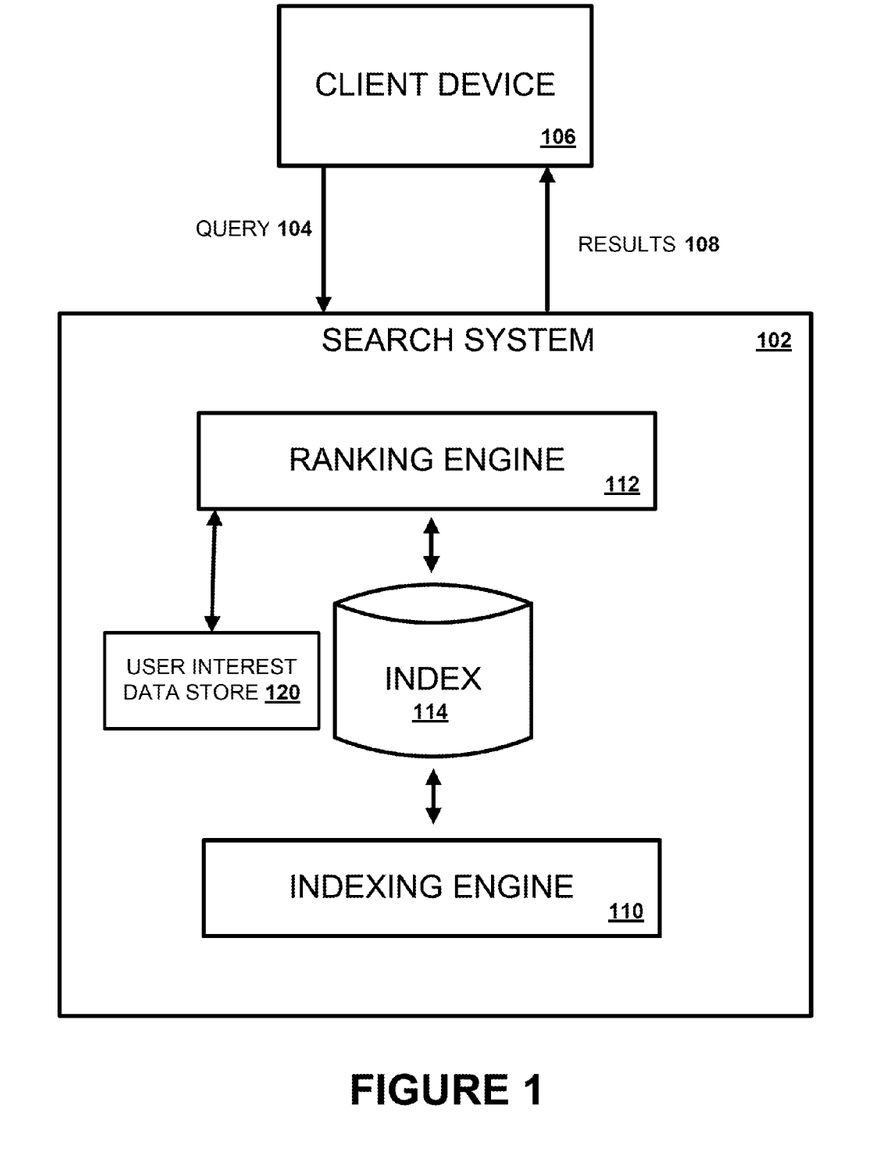
FIG. 1 illustrates an example system.

FIG. 1 illustrates an example search system 102. The search system 102 can be implemented on one or more computers that communicate, for example, through a network. The system receives queries 104 from a client device 106 and generates results 108 with summarized content that includes extracts from the referenced content. Each query 104 is an electronic communication such as an e-mail, post, text message, etc. The query 104 can be, for example, in text form or in other forms, for example, in audio form or in image form. In some implementations, a query 104 may be implicit and based on information gathered about a user with the user's consent. For example, a system may make recommendations based on a user's identifier, a user context such as geographic location as well as other user data, or an explicit query by the user.

The search system 102 and the client device 106 can communicate through a network, for example, an intranet or the Internet. While the search system 102 and the client device 106 are shown as two separate devices, in some implementations, the search system 102 and the client device 106 can be the same device.

The search system 102 includes an indexing engine 110 and a ranking engine 112. The indexing engine 110 maintains an index 114 for use by the search system 102. The indexing engine 110 processes documents and updates index entries in the index 114, for example, using conventional or other indexing techniques.

In some implementations, the search system 102 may maintain a user interest data store 120. In the instance where a user consents to the use of such data, the user interest data store 120 may include one or more entities (an "entity" may be a person, place, thing, or concept), websites, text, search queries, item purchase records, videos viewed, music played, demographic data, or other user interest information that may be used by search system 102. In some implementations, the user interest data store 120 may classify search queries by user, by frequency, by location, and by date or time, where the user consents to the use of such data. In some implementations, the user interest data store 120 may be included as part of index 114. In some implementations, the user interest data store 120 may be stored at a remote server.

The ranking engine 112 may use the index 114 to identify documents responsive to the query 104, for example, using conventional or other information retrieval techniques. The ranking engine 112 calculates scores for the documents responsive to the queries, for example, using one or more ranking signals. Each signal provides information about the document itself or the relationship between the document and the message. One example signal is a measure of the overall quality of the document. Another example signal is a measure of the number of times terms of the query occur in the document. Other signals can also be used, such as measures of personalized content based on behavior in a source domain, as discussed in more detail below with respect to FIGS. 2-4. The ranking engine 112 ranks the responsive documents or portions of documents using the scores.

The search system 102 uses the documents identified and scored by the ranking engine 112 to generate results 108. The results 108 include results corresponding to documents responsive to the query 104. For example, a result can include a title of a document, a link to the document, and a summary of content from the document that is responsive to the query. Other examples of results 108 include a summary of information responsive to the query. The summary can be generated from documents responsive to the query or from other sources. Still other examples of results 108 include personalized content such as suggested links, videos, music, or products, as discussed in more detail below.

A "product" as referred to here may include a video, a web application, a standalone application, a website, a game, or any online activity. An "attribute" referred to here may include, as examples, a cluster (i.e., a group of users), an entity, or demographic information.

A "domain" as described here may be a set of actions, activities, or data that a user can interact with in a particular system such as a website or an online application such as a web application. An activity or behavior in a domain may include, for example, search queries, requests, video searches or plays, music searches or plays, online product purchases (e.g., of books, clothing, songs, videos, or other items), mailing list subscriptions, etc., in the instances where users consent to the use of data associated with the activities or behaviors.

A source domain may be a website and activity in the source domain may include web search behavior. A target domain may be another website, and the system may provide suggested movies or music for a user of the target domain. As a simplified example, a user may input a query 104 for "beach vacations" in a target domain. The search system 102 may determine that the user who input the query 104 is a new or unidentified user of the target domain (e.g., the user is not logged-in to the target domain, the user lacks previous recorded behavior in the target domain, etc.). The system may also determine that the user has some behavior in the source domain, for example by searching various data stores, as described in more detail below with respect to FIGS. 2-5.

Using a model, which is described in more detail below with respect to FIG. 2, the search system 102 may make recommendations, for example in the form "users who had attribute x tend to like in-product item y." For example, "users in cluster XYZ tend to like videos about technology gadgets," or "users with an interest in entity ABC tend to like vegetarian cookbooks." The two example attributes above (that is, clusters and entities of interest) may be stored in user interest data store 120 (with the consent of the user), which may contain a summary of the user's activity across multiple domains.

In some implementations, the system may determine that a new user in the target domain has no recorded behavior in the source domain, but does have sufficient activity available from a proxy domain (i.e., a domain with similar properties as the source domain). For example, the proxy domain may be website that is a version of the target domain where a user is not logged in to a user account. The system may make personalized predictions based on the user's previous behavior in the proxy domain. For example, where users have consented to the use of such data, for users that have web history enabled, the system may build a model of how web page visits predict video searches or plays, music searches or plays, book purchases, products purchased, etc. For a logged out user whose browsing history is known (for example, using a cookie, where the user has consented to the use of such data), the system may treat the logged out browsing history in the proxy domain as if it were logged in web history in a target domain, making recommendations based on visited pages, using the model. In various implementations, multiple source domains or proxy domains may be used for one or more target domains.

The system may utilize a model, which is described in more detail below with respect to FIG. 2, to provide relevant and personalized results 108 to the user based on the query 104. The system may thus provide the user with a customized experience by identifying similar user types based on similar information about other (e.g., logged-in, identified) users. Other examples of results 108 generated by the search system 102 are described in more detail below with respect to FIGS. 2-5.

Figure 2:
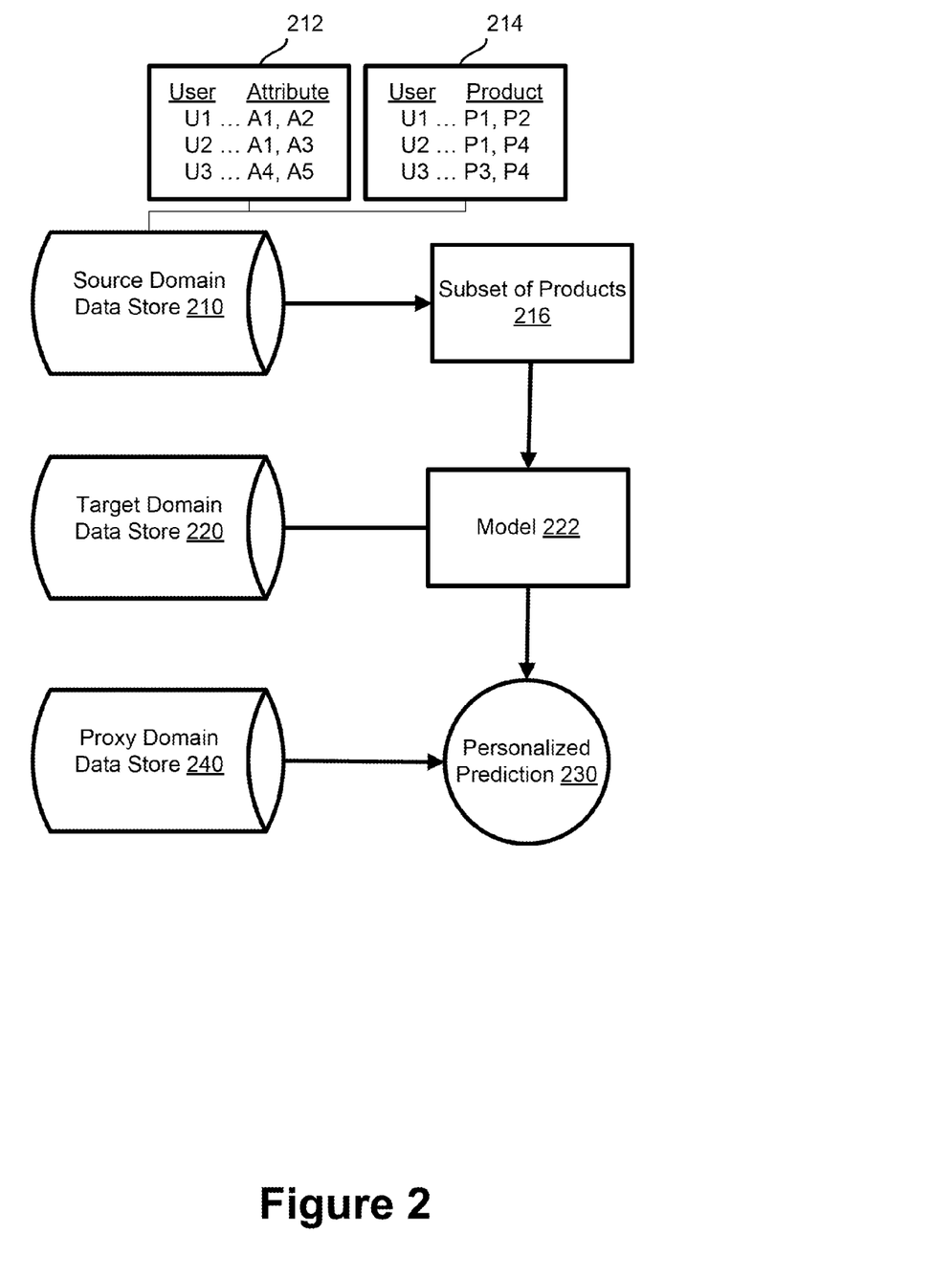
FIG. 2 is an example system that may be used to generate personalized content.

FIG. 2 is an example system that may be used to generate personalized content. System 200 includes source domain data store 210, target domain data store 220, and proxy domain data store 240. As shown in FIG. 2, the source domain data store 210 may include one or more tables (which may be encrypted), table 212 and table 214. In the example shown in system 200, table 212 includes a mapping of users to attributes. For example, as shown in table 212, user U1 is mapped to attributes A1 and A2, user U2 is mapped to attributes A1 and A3, and user U3 is mapped to attributes A4 and A5.

Table 214 includes a mapping of users to products. For example, as shown in table 214, user U1 is mapped to products P1 and P2, user U2 is mapped to products P1 and P4, and user U3 is mapped to attributes P3 and P4. The products may come from recent activity within a predetermined time period, such as videos watched in the last week or products purchased in the last month. In some implementations, a user with multiple products may have multiple rows in the table 214. In various implementations, products may include suggested activity, such as suggested restaurants or stores to visit based on a user's geographic location, or a suggested flight, hotel, or reservation to reserve.

The table 212 and the table 214 can be read from a data store such as source domain data store 210.

The system 200, for example using the search system 102, may generate a subset of products 216 using at least the data from source domain data store 210 (e.g., tables 212 and 214). For example, the system may combine the table 212 and table 214 (e.g., using a join procedure) to produce the subset of products 216 that contains a set of top scoring products for each attribute. The join may be designed to prevent privacy leaks by ensuring minimum thresholds for a number of users with an attribute and for a number of times an item is associated with an attribute before it can have a score. For example, in one implementation, the system may first join the tables. The system may count how many users have each attribute, how many users have each product, and how many users with a given attribute have a given product. The system may filter (e.g., remove) attributes applicable to fewer than a minimum number of users in a cluster (i.e., a group of users). For the remaining attributes, items that appear fewer than a minimum number of times are discarded. The system may score the remaining items for each attribute. The system may rank a predetermined number (e.g., 200) of top scoring items for each attribute and record the items (e.g., one item per attribute).

The system may use the subset of products 216 to create a set of recommendations for a particular user on the basis of which attributes the particular user has. Such a recommendation may be generated dynamically, for example when the user accesses the target domain. In some implementations, the recommendations may be generated offline.

To create recommendations, the system may generate a model 222 using data from the subset of products 216 and using information from the target domain data store 220. The system may combine the table 212 (a table mapping users to attributes) with the table 214 (mapping users to products, for example in a particular client's id space, e.g. videos) to produce a set of top scoring products for each attribute.

In some implementations, if a user has multiple attributes that have the same product, there may be different ways of assigning a score. One way is to choose a maximum score among all the attributes, as described in more detail below. Another option is to take the product of scores. The system may select the top scoring items (across all of a user's attributes) for each user (e.g., based on a user identifier). The generated table can then be loaded into any serving infrastructure.

The system may use the model 222 to generate a personalized prediction 230 for a particular user. The system may generate the personalized prediction 230 offline, in some implementations, to pre-compute a set of candidates for a particular user (e.g., in target domain such as a video website homepage). In some implementations, the system may generate the personalized prediction 230 dynamically, e.g., in response to a query in the target domain such as an online application store.

In some implementations, the system may determine that the particular user is a new user in the target domain that has no recorded behavior in the source domain (e.g., using source domain data store 210). In such a case, the system may determine whether the particular user has any (or sufficient) recorded behavior in a proxy domain (a domain with similar properties to the source domain), for example using a proxy domain data store 240. The system may make a personalized prediction 230 based on the data from the user's behavior in the proxy domain, e.g., using the proxy domain data store 240. In some implementations, the system may also utilize the model 222 to make the personalized prediction along with the data from the proxy domain data store 240.

In some implementations, in instances where users have consented to the use of such data, the system (e.g., system 200) stores a summary of user interests and attributes, including assignments of users to clusters. User interests may be determined based on a variety of factors, such as search activity, video watching activity, entities provided by a user, or other information that is obtained with the consent of the user. Users can be assigned more than one cluster-id in a single model-instance. In some implementations, the system discards contain clusters assignments from a model-instance after a predetermined amount of time (e.g., one year). The system may periodically calculate assignments of users to a predetermined total number of clusters.

Because similar users may prefer similar content, the system may determine that users that are like Ben with respect to video play history tend to buy music by some artist, so the system may recommend that artist on Ben's online web store home screen.

The following includes example implementations of recommendations derived from user clusters. In this example, an "attribute" is an automatically inferred cluster. For a given domain, the system can assign a user to one or more clusters. To do so, the system may use k-means clustering or any other unsupervised clustering algorithm in some feature space derived from user histories, the cluster may be inferred from demographics, etc. In an unweighted case, for each source domain s a function $f_s$ maps users u to cluster identifiers c drawn from a set of domain-specific cluster identifiers $C_s$ $$f_s: u \to \{c \in C_s\}.$$

If a source domain does not know about user u, then the resulting set may be empty: $f_s:(u)=\{\ \}$.

For some target domain t with a set of outcomes $x \in X_t$ for modeling, function g maps users to set of outcomes associated with that user. These outcomes $X_t$ might be (in instances where the user has consent to the use of such data) video watches on a website, songs purchased in an online digital goods store, or even interests explicitly provided by a user.

$$g_t: u \to \{x \in X_t\}$$

If a user does not have a history in the target domain, $g_t(u)$ may be empty.

The system may estimate the likelihood that a generic user in cluster c has an item x. Formally, this is represented with a Bernoulli random variable $o_{c,x} \in \{0,1\}$ drawn from an asymmetric beta prior with parameters $\{\alpha^{(neg)}, \alpha^{(pos)}\}$. The system may empirically estimate the likelihood that $o_{c,x}=1$ via the MAP estimate:

$$P(o_{c,x}=1;\alpha) = \frac{\alpha^{(pos)} + \sum_{u \in U_t} \sum_{c \in C_s} \sum_{x \in X_t} I[c \in f_s(u) \land x \in g_t(u)]}{\alpha^{(neg)} + \alpha^{(pos)} + \sum_{u \in U_t} \sum_{c \in C_s} I[c \in f_s(u)]}$$

This estimate is the (pseudocount-smoothed) fraction of users in cluster c which were observed to have outcome x. The pseudo-count smoothing parameters $\alpha$ are equivalent to having observed $\alpha^{(pos)}$ (default=1) users in cluster c with outcome x and $\alpha^{(neg)}$ (default=50) without it. Smoothing dampens the impact of very small clusters.

In some contexts, such as with music on an online digital goods store, the most popular items may be so popular that they may dominate across all clusters. As a result, the system may downweight very popular recommendations to encourage diversity among the top recommendations for each cluster.

The system may recommend items for a given user u. The system determines how likely it is the user to have each given item in $X_t$, given that the user is in the set of clusters $f_s(u)$. In such an example, the user may have enough data in the source domain to be assigned to a cluster in the source domain. In other cases, the system may assign clusters based on data in the proxy domain. The likelihood a user should have the given item may be high if the user is in any cluster where users tend to have that item. For example, if a user is in a cluster of golf players and guitar players, the system may recommend videos popular among either kind of users in that cluster (golf players or guitar players). A Bernoulli random variable $h_{u,x} \in \{0,1\}$ may represent whether a user has an item. Items may be ranked by likelihood:

$$P(h_{u,x}=1) = \max_{c \in f_s(u)} P(o_{c,x}=1;\alpha)$$

In alternative or additional implementations, the system can compute an empirical distribution over the outcomes in $X_t$ for all cluster identifiers $C_s$ in source channel s by counting the occurrence of each outcome across all users $U_t$ in the target domain t.

$$o_{c,x} = (\sum_{u \in U_t} \sum_{c \in C_s} \sum_{x \in X_t} I[c \in f_s(u) \land x \in g_t(u)]) / (\sum_{u \in U_t} \sum_{c \in C_s} I[c \in f_s(u)])$$

The vector $o_{c,:}$ encodes the fraction of users in cluster c of source channel s that are associated with outcome x in target channel t. The system may add a pseudo-count value $\alpha \in R^+$ to these counts, and raise the result to a power $\gamma$. This defines an empirical joint distribution of outcomes, $P(x,c;\alpha,\gamma)$, from which the system can compute marginal distributions over outcomes $P(x;\alpha,\gamma)$ and over clusters $P(c;\alpha,\gamma)$.

$$P(x,c;\alpha,\gamma) \propto (\alpha + o_{c,x})^\gamma$$

$$P(x;\alpha,\gamma) = \sum_{c \in C_s} P(x,c;\alpha,\gamma)$$

$$P(c;\alpha,\gamma) = \sum_{x \in X_t} P(x,c;\alpha,\gamma)$$

The temperature parameter $\gamma$ controls how peaked the resulting distribution is, dampening the impact of extremely popular items. The system may select $\gamma$ to limit the maximum ratio r (=100) of the probabilities of the highest count outcome to the lowest count outcome in the marginal distribution over outcomes.

$$\gamma = \min\left[1, \frac{\log r}{\log(\alpha|C_s| + \max_x \sum_c o_{c,x}) - \log(\alpha|C_s| + \min_x \sum_c o_{c,x})}\right], r = 100$$

Because $0 < \gamma_c <= 1$ the exponentiation will never make the distribution more spiked.

Finally, the system may score each outcome with respect to its cluster in one of at least two methods. The first method uses a maximum likelihood estimate, picking k=10,000 to give reasonably scaled values:

$$S_{ml}(c,x) = k \cdot P(x|c;\alpha,\gamma) = k \cdot P(x,c;\alpha,\gamma)/P(c;\alpha,\gamma)$$

The score represents how likely a user is to be associated with outcome x given that the user is in cluster c. This score tends to be head-biased—popular items tend to get the highest scores, even if they are not over-represented in a cluster. As a result, the top scoring items do not always look particularly "representative" of a cluster.

In the second method, the system uses pointwise mutual information:

$$S_{mi}(c,x) = \log_2 \frac{P(x,c;\alpha,\gamma)}{P(x;\alpha,\gamma) \cdot P(c;\alpha,\gamma)}$$

The score represents (in bits) how much more or less likely is outcome x from users in cluster c than outcome x overall. These scores tend to favor items that are disproportionately represented in a given cluster. As a result, the top scoring items may tend to be very descriptive of what is unique about a cluster, even if those items are not particularly popular in the cluster.

Figure 3:
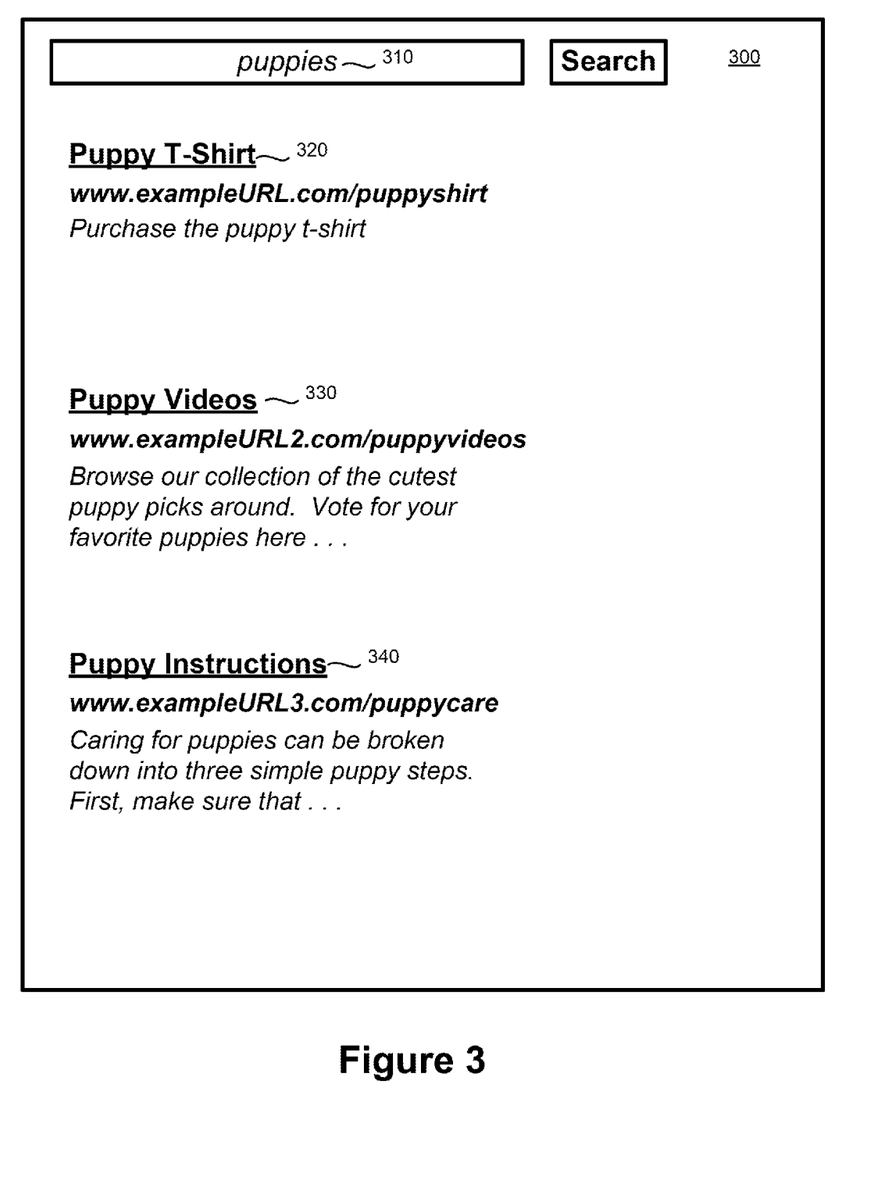
FIG. 3 is an example user interface.

FIG. 3 is an example user interface. As shown in FIG. 3, a system such as search system 102 may present a user interface 300. In this example, the particular user may type a query 310 into a search toolbar of a target domain. The system may respond with results in the form of a link 320, a link 330, and a link 340. The link 320, the link 330, and the link 340 may each be a personalized prediction for the user, such as the personalized prediction 230 which was described above with respect to FIG. 2.

In some implementations, in the instance where a user consents to the use of such data, the search system 102 generates the personalized predictions automatically as the sender types the query 310. In other implementations, the system may generate the personalized predictions offline and present them to a user when the user visits a web page, even without the user entering a query in that web page.

Figure 4:
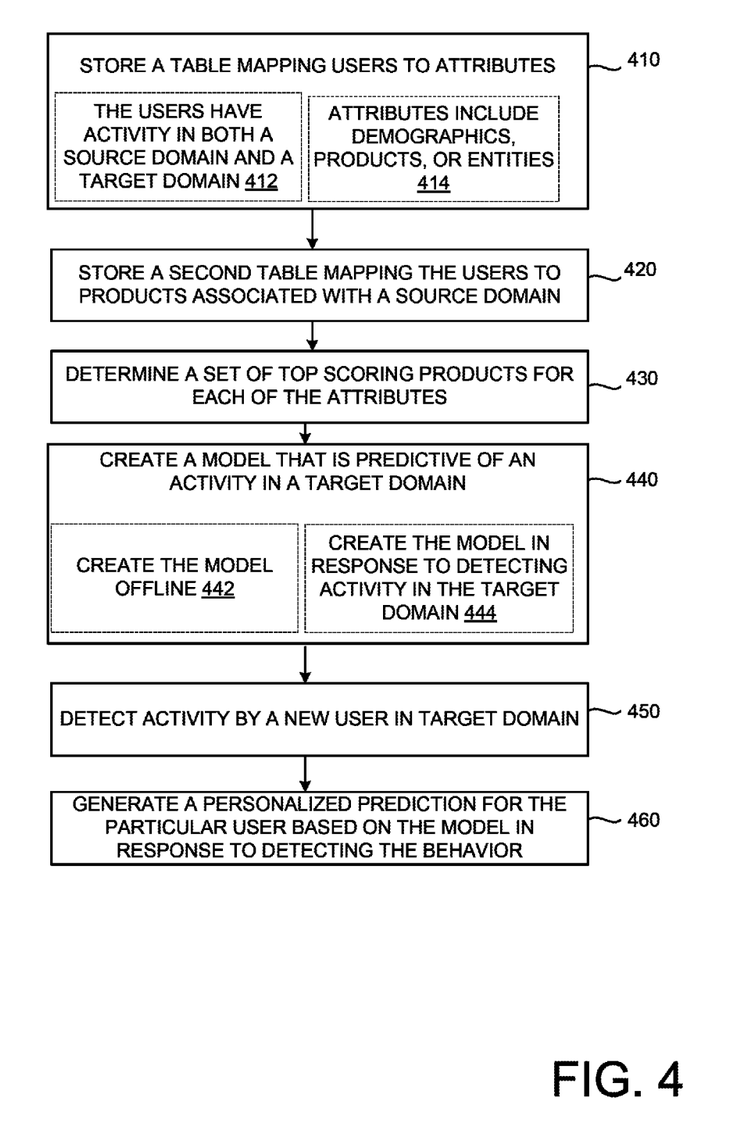
FIG. 4 is a flow chart illustrating an example method of generating personalized predictions.

FIG. 4 a flow chart illustrating an example method of generating personalized predictions. For convenience, the steps of the flow chart are described with reference to a system that performs the steps. The system can be, for example, search system 102 described above with reference to FIG. 1, system 200 described above with respect to FIG. 2, or other systems.

In the example of FIG. 4, the system stores a table mapping users to attributes (410). For example, the system may store an encrypted table such as table 212 shown in FIG. 2. The data in the table may be continually updated, with the consent of the users. In some implementations, the users may include users that have activity in both a source domain and a target domain (412). In some implementations, the attributes include demographics, products, or entities (414).

The system stores a second table mapping the users to products associated with a source domain (420). For example, the system may store an encrypted table such as table 214 shown in FIG. 2. The system determines a set of top scoring products for each of the attributes (430), e.g., using the tables. The system creates a model that is predictive of an activity in a target domain (440). For example, the system creates the model 222 shown in FIG. 2. In some implementations, the system may create the model offline (442), for example to pre-compute a set of candidates for a particular user of a video website. In some implementations, the system may create the model in response to detecting activity in the target domain (444). The system detects the activity by a new user in the target domain (450). For example, the system receives a search query for a topic, or a web page visit by the new user. The system generates a personalized prediction for the particular user based on the model, in response to detecting the behavior (460).

Figure 5:
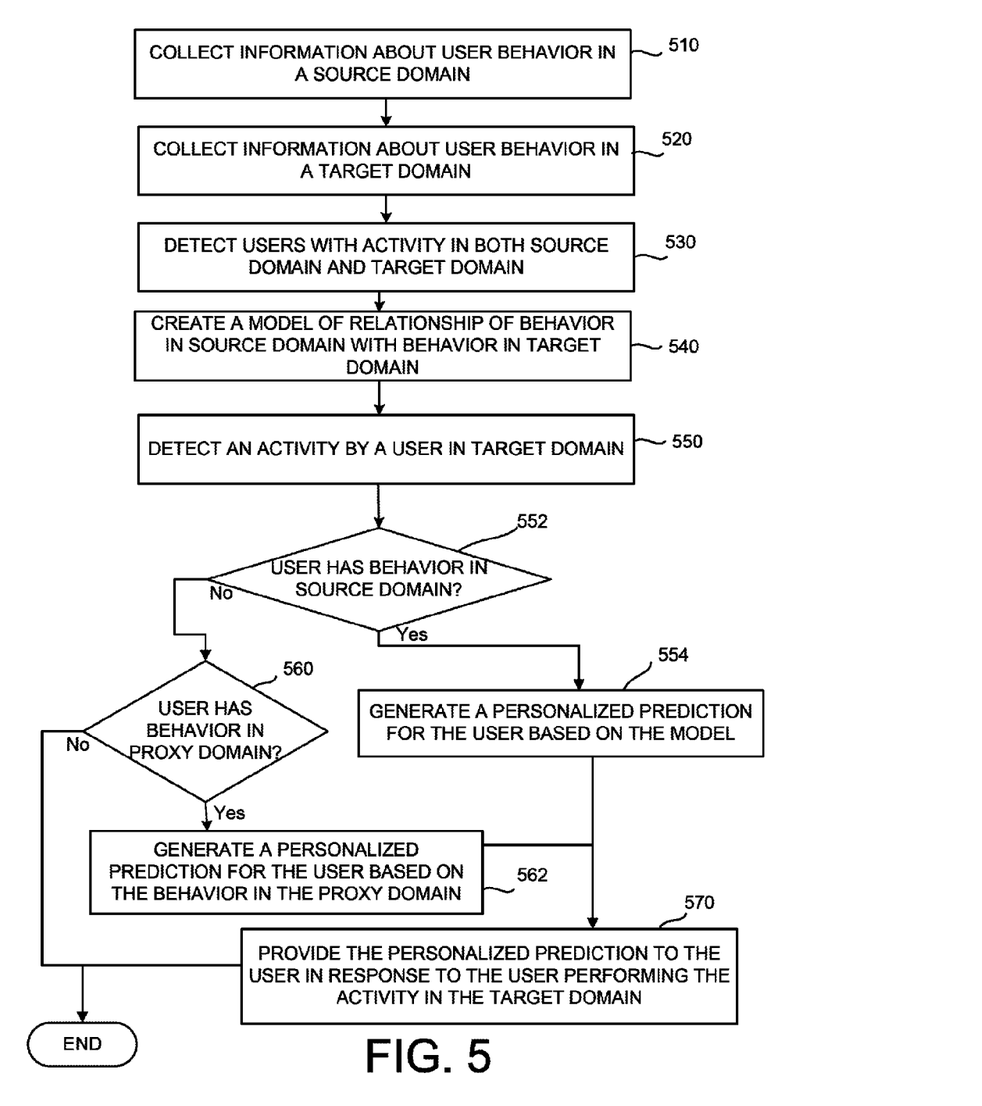
FIG. 5 is a flow chart illustrating an example method of generating personalized predictions.

FIG. 5 a flow chart illustrating an example method of generating personalized predictions. For convenience, the steps of the flow chart are described with reference to a system that performs the steps. The system can be, for example, search system 102 described above with reference to FIG. 1, system 200 described above with respect to FIG. 2, or other systems.

In the example of FIG. 5, the system collects information about user behavior in a source domain (510). The system collects information about user behavior in a target domain (520). The system detects users with activity in both the source domain and the target domain (530). The system creates a model of a relationship of the behavior in the source domain with the behavior in the target domain (540). The system detects an activity by a user in the target domain (550). The system determines if the user has behavior in the source domain (552). If the user has behavior in the source domain (552, yes), the system generates a personalized prediction for the new user based on the model (554), and provides the personalized prediction to the user in response to the user performing the activity in the target domain (570). For example, the system may provide personalized links, suggested videos or clothing, or specific advertisements that may interest the user.

If the user has no behavior in the source domain (552, no), the system determines if the user has behavior in the proxy domain (560). If the user does not have sufficient recorded behavior in the proxy domain (560, no), the process may end. If the user has behavior in the proxy domain (560, yes), the system generates a personalized prediction for the user based on the behavior in the proxy domain (562). In some implementations, the system may also generate the personalized prediction using the model or using other data. The system provides the personalized prediction to the user in response to the user performing the activity in the target domain (570).

Figure 6:
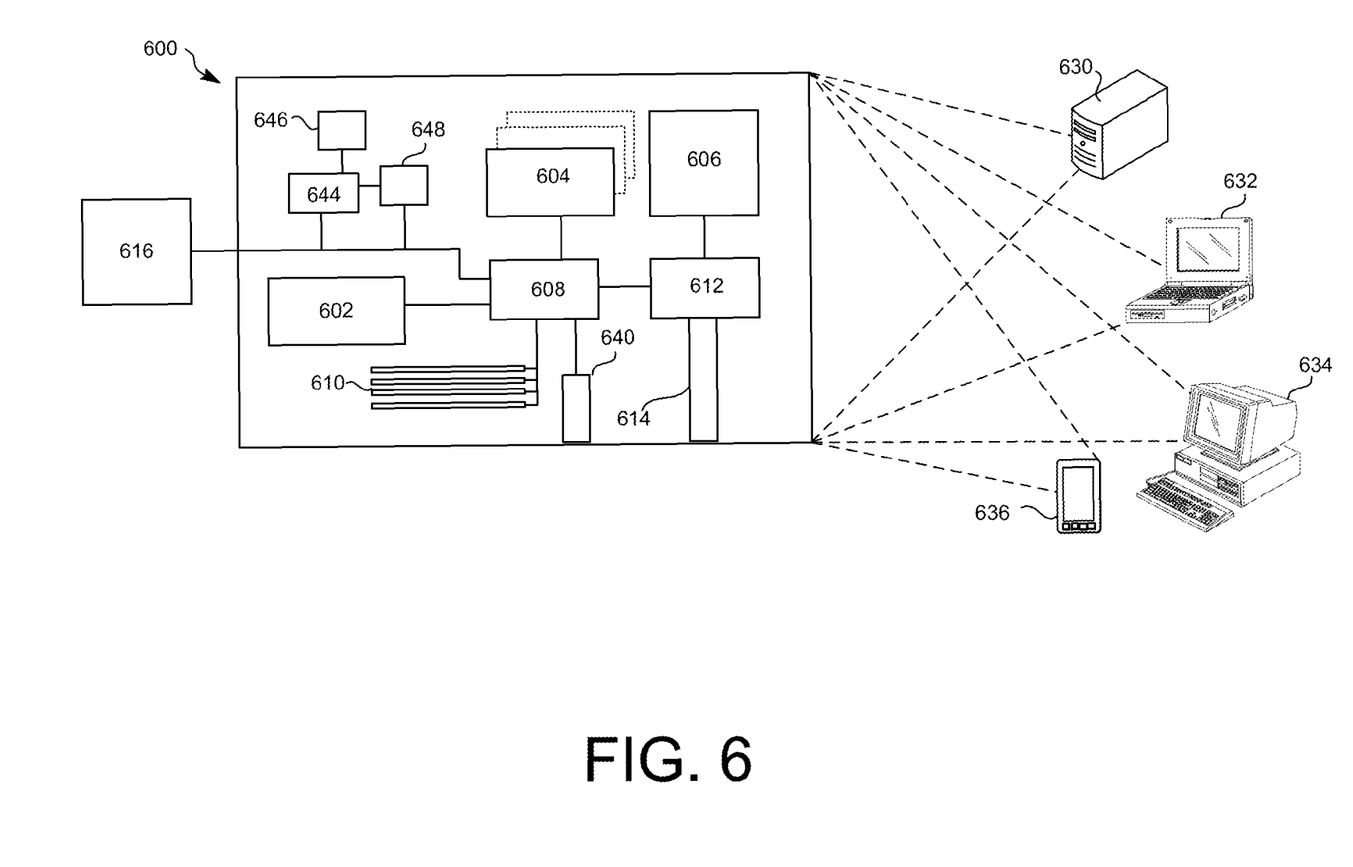
FIG. 6 is an example of a generic computer device that may be used with techniques described here.

FIG. 6 shows an example of a generic computer device 600, which may be search system 102 of FIG. 1, and which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations described or claimed in this document.

Computing device 600 includes a processor 602, a memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computer such as a laptop computer 622, or smart phone 636. An entire system may be made up of multiple computing devices 600 communicating with each other. Other configurations are possible.

Figure 7:
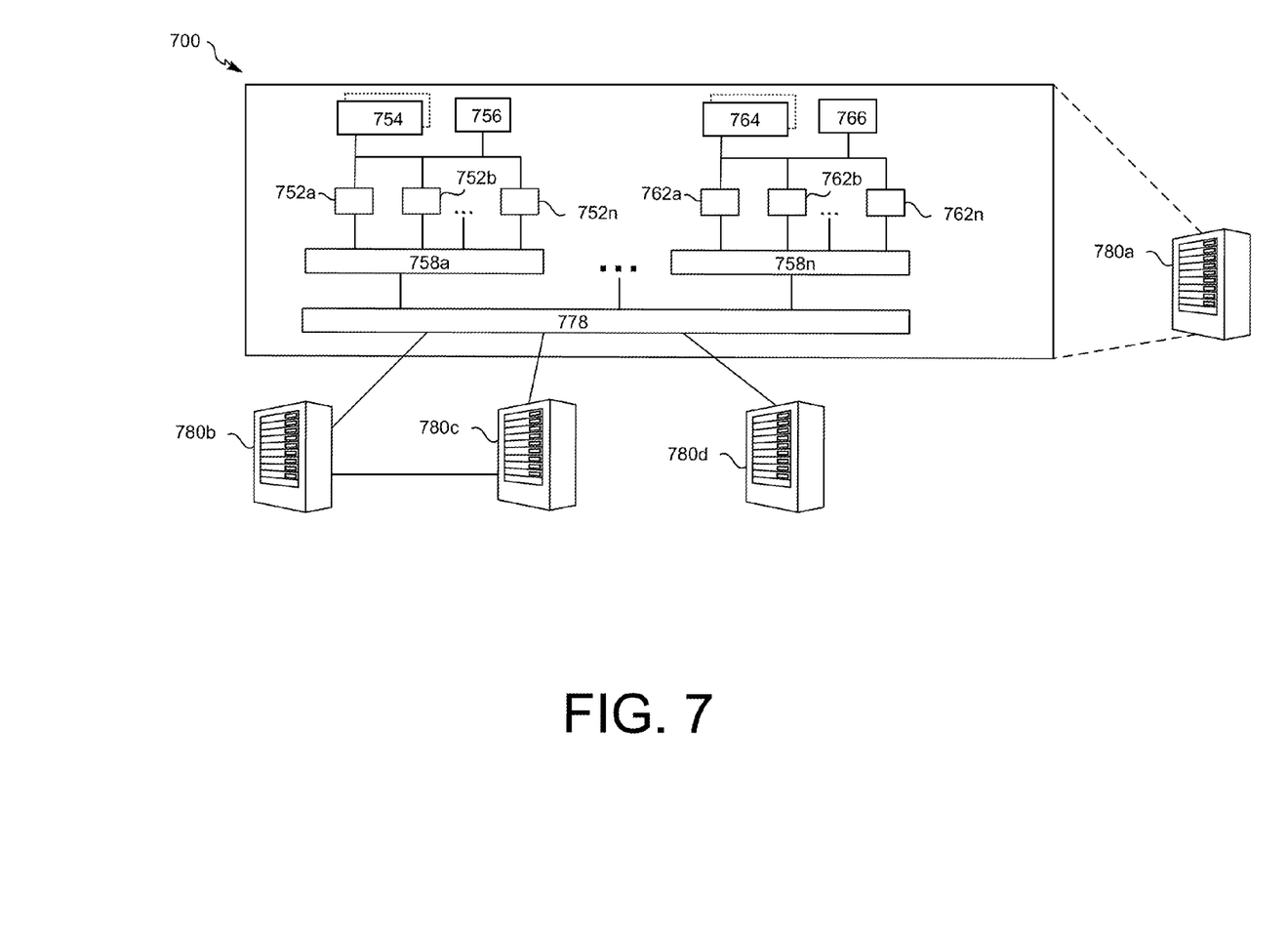
FIG. 7 is an example of a generic computer device that may be used with techniques described here.

FIG. 7 shows an example of a generic computer device 700, which may be search system 102 of FIG. 1, and which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes that are interconnected by one or more communication networks. The components shown here, their connections and relationships, and their functions, are meant to be exemplary only, and are not meant to limit implementations described or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-552n and 762a-562n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, or other forms of computer-readable media, such as a magnetic or optical disks, flash memory, cache, Random Access Memory (RAM), Read Only Memory (ROM), and combinations thereof. Memory, such as memory 754 may also be shared between processors 752a-552n. Data structures, such as an index, may be stored, for example, across storage 756 and memory 754. Computing device 700 may include other components not shown, such as controllers, buses, input/output devices, communications modules, etc.

An entire system, such as search system 102, may be made up of multiple computing devices 700 communicating with each other. For example, device 780a may communicate with devices 780b, 780c, and 780d, and these may collectively be known as search system 102. As another example, search system 102 of FIG. 1 may include one or more computing devices 700 as indexing engine 110, a separate computing device 700 as search system 102, and one or more computing devices 700 as index 114. Furthermore, some of the computing devices may be located geographically close to each other, and others may be located geographically distant. The layout of system 700 is an example only and the system may take on other layouts or configurations.

Various implementations can include implementation in one or more computer programs that are executable or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural or object-oriented programming language, or in assembly/machine language. As used herein, the terms "machine-readable medium" "computer-readable medium" refers to any non-transitory computer program product, apparatus or device (e.g., magnetic discs, optical disks, memory (including Read Access Memory), Programmable Logic Devices (PLDs)) used to provide machine instructions or data to a programmable processor.

The systems and techniques described here can be implemented in a computing system that includes a back end component, for example, as a data server, or that includes a middleware component such as an application server), or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the disclosure. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
storing a first table mapping first users to attributes;
storing a second table mapping the second users to products associated with a source domain;
joining the first table with the second table on user to find attributes and top scoring products for the source domain for each of third users, the third users being common to the first users and the second users;
creating a model that is predictive, using an attribute for the source domain, of activities in a target domain, the target domain being separate from the source domain, the model using an estimation of the fraction of third users having the attribute for the source domain also observed to have the activity in the target domain;
detecting a behavior from a particular user accessing the target domain;
determining an attribute for the source domain for the user; and
generating a personalized prediction for the particular user based on the model and the attribute, in response to the detecting the behavior.

2. The method of claim 1, wherein the model is created from information for users having activity recorded in both the source domain and the target domain.

3. The method of claim 1, further comprising:
determining that the particular user lacks recorded behavior in the target domain;
determining that the particular user has recorded behavior in the source domain;
generating the personalized prediction using the recorded behavior in the source domain; and
providing the personalized prediction for the particular user.

4. The method of claim 1, wherein the products include at least one of a video, a purchased product, a search query, or a suggested activity.

5. The method of claim 1, wherein the attributes and top scoring products for the source domain for each of the third users are limited to within a predetermined time period.

6. The method of claim 1, wherein the attributes include demographics, clusters, or entities.

7. The method of claim 1, wherein creating the model is performed offline.

8. The method of claim 1, further comprising:
creating the model in response to detecting the behavior in the target domain.

9. A method comprising:
creating a model that is predictive of, using an attribute for a source domain, an activity in a target domain, the target domain being separate from the source domain and the model using an estimation of the fraction of a set of users having the attribute for the source domain also observed to have the activity in the target domain;
determining that a particular user lacks recorded behavior in the source domain;
in response to determining that the particular user lacks recorded behavior in the source domain, determining that the particular user has sufficient recorded behavior in a proxy domain to assign the user to an attribute associated with the source domain, the proxy domain being separate from the source domain and having similar properties as the source domain; and
in response to determining that the particular user has sufficient recorded behavior in the proxy domain, determining a first attribute for the user based on the recorded behavior in the proxy domain and generating a personalized prediction for the particular user based on providing the first attribute to the model, wherein the model generates the personalized prediction.

10. The method of claim 9, wherein the personalized prediction for the particular user is generated in response to the particular user accessing the target domain.

11. The method of claim 9, wherein the activities include at least one of a watching a video, viewing an item, or submitting a search query.

12. The method of claim 9, wherein creating the model is performed offline.

13. The method of claim 9, further comprising:
creating the model in response to detecting the particular user accessing the target domain.

14. The method of claim 9, wherein the attributes are clusters of users and the estimate is pseudo-count-smoothed to dampen an impact of small clusters.

15. A system comprising:
a memory storing instructions; and
a processor operably coupled to the memory and configured to execute the instructions to cause the system to perform operations including:
determining a set of attributes for a source domain;
creating a model that is predictive of, using an attribute from the set of attributes for the source domain, an activity in a target domain, the target domain being separate from the source domain and the model using an estimation of the fraction of a set of users having the attribute also observed to have the activity in the target domain;
detecting a particular user accessing the target domain;
determining that the particular user lacks recorded behavior in the source domain;
in response to determining that the particular user lacks recorded behavior in the source domain, determining that the particular user has sufficient recorded behavior in a proxy domain to assign the user to an attribute of the set of attributes for the source domain, the proxy domain being separate from the source domain and having similar properties as the source domain; and
in response to determining that the particular user has sufficient recorded behavior in the proxy domain, determining a first attribute of the set of attributes for the user based on the recorded behavior in the proxy domain and generating a personalized prediction for the particular user based on providing the first attribute to the model, wherein the model generates the personalized prediction.

16. The system of claim 15, wherein the set of attributes are a set of automatically inferred clusters.

17. The system of claim 15, wherein determining the set of attributes for the source domain includes:
mapping an attribute to a set of product items associated with users with the attribute.

18. The system of claim 15, wherein the model down-weights activities popular among all attributes in the set of attributes for the source domain.

19. The system of claim 17, wherein the products include at least one of a video, a purchased product, a search query, or a suggested activity.

20. The system of claim 15, wherein the first attribute is a cluster and the particular user is assigned to the cluster based on the recorded behavior in the proxy domain.

* * * * *

UNITED STATES PATENT AND TRADEMARK OFFICE
CERTIFICATE OF CORRECTION

PATENT NO. : 9,507,830 B2
APPLICATION NO. : 14/206880
DATED : November 29, 2016
INVENTOR(S) : Chang et al.

Page 1 of 1

It is certified that error appears in the above-identified patent and that said Letters Patent is hereby corrected as shown below:

In the Claims

In Column 13, Line 6, Claim 1, delete "mapping the second" and insert --mapping second--, therefor.

Signed and Sealed this
Twenty-third Day of May, 2017

Michelle K. Lee
*Director of the United States Patent and Trademark Office*